Oct. 11, 1966 R. C. MORTON 3,278,939

SCALE FACTOR ADJUSTMENT APPARATUS

Filed May 4, 1964 7 Sheets-Sheet 1

INVENTOR.
Robert C. Morton
BY Fraser and Bogucki
Albert Rosen
Attorneys

Oct. 11, 1966 R. C. MORTON 3,278,939

SCALE FACTOR ADJUSTMENT APPARATUS

Filed May 4, 1964 7 Sheets-Sheet 2

INVENTOR.
Robert C. Morton

BY Fraser and Bogucki
Albert Rosen
Attorneys

INVENTOR.
Robert C. Morton
BY Fraser and Bogucki
Albert Rosen
Attorneys

Oct. 11, 1966 R. C. MORTON 3,278,939

SCALE FACTOR ADJUSTMENT APPARATUS

Filed May 4, 1964

7 Sheets-Sheet 4

INVENTOR.
Robert C. Morton
BY
Fraser and Bogucki
Albert Rosen
Attorneys

SCALE FACTOR ADJUST MECHANISM

INVENTOR.
Robert C. Morton
BY Fraser and Bogucki
Albert Rosen
Attorneys

Oct. 11, 1966 R. C. MORTON 3,278,939

SCALE FACTOR ADJUSTMENT APPARATUS

Filed May 4, 1964

7 Sheets-Sheet 6

INVENTOR.
Robert C. Morton
BY Fraser and Bogucki
Albert Rosen
Attorneys

Oct. 11, 1966 R. C. MORTON 3,278,939

SCALE FACTOR ADJUSTMENT APPARATUS

Filed May 4, 1964 7 Sheets-Sheet 7

INVENTOR.
Robert C. Morton
BY Fraser and Bogucki
Albert Rosen
Attorneys

United States Patent Office 3,278,939
Patented Oct. 11, 1966

3,278,939

SCALE FACTOR ADJUSTMENT APPARATUS

Robert C. Morton, Anaheim, Calif., assignor to California Computer Products, Inc., Anaheim, Calif., a corporation of California Filed May 4, 1964, Ser. No. 364,856
20 Claims. (Cl. 346—70)

The subject invention relates to means for adjusting a ratio between corresponding input and output motions of a mechanical translating device, and more particularly to a new and improved arrangement for adjusting the scale factor of a cable-driven graphical recording device.

In the design of mechanical motion translating devices such as, for example, graphical recording systems, a cable-drive may be employed to position a marking element or stylus. The marking element is frequently driven axially along a set of traverse rods, the axial or translational motion being imparted by a rotational driving member such as the drive shaft of an electric motor. A drive cable couples the rotary drive motion of the driving member to the translationally-driven member by means well known in the prior art.

In the application of cable drive systems to graphical recorders, it is necessary to relate a preselected recorder input signal to a preselected displacement of the recorder stylus or driven member in order to record information on a recording medium such as a strip chart or ruled graph paper. Where the gain or scale factor between the magnitude of the data signal input and the stylus displacement indicated on the strip chart is not accurately known, or, if known subsequently changes by an unknown amount, the recorded data may be in error by the amount of the difference between the recorded data value and the actual value of the data signal input.

In general, recording errors arise from two sources: (1) errors in the calibration of the recorder device itself and (2) errors in the graph scale or rule marks on the recording paper or strip chart. The calibration errors in the recorder device may arise from manufacturing tolerances or differences between individual devices of a given model or manufacturing run. Also, such errors in the recorder may arise from subsequent wear during the life of an individual machine which may have been once precisely calibrated.

Errors in the graph scale of the recording paper may arise, for example, from changes in humidity and temperature which cause either shrinkage or stretching of the paper. Further, a particular recording error may be due to both errors in the recording system and in the recording paper whereby it is desirable, if not necessary, to precisely match a particular recording machine and particular recording paper specimen by adjusting the gain or ratio of the static response of the stylus to an input signal.

Accordingly, it is an object of the subject invention to provide improved cable drive means.

It is another object of the invention to provide means for adjusting the ratio of the motion of a driven element to that of a drive element in a cable drive system.

It is yet another object of the subject invention to provide extensible loop means in a cable drive system for varying the motion of a driven element thereof in accordance with the motion of a drive element thereof.

It is still a further object of the subject invention to provide means for adjusting the response of an extensible loop to a drive member of a cable drive system.

It is a further object of the invention to provide extensible loop means for adjusting the scale factor of graphic recording devices.

Accordingly, the present invention provides means for adjusting the gain or ratio of mechanical output motion to input motion of a cable drive system.

In accordance with a preferred embodiment of the subject invention, there is provided a cable drive system having a driving member in cooperation with a driven member. There is also provided an extensible cable loop comprising a cable of the cable drive system in cooperation with a double pulley at one end of the loop and a single pulley at the other end. Loop control means responsive to the drive motion of the driving member of the cable drive system varies the relative distance between the pulleys (e.g., varies the loop size), whereby the position of the driven member is a function of the cooperation of the loop control means and the driving member.

The loop control means may also be variably responsive to the position of the driven member and, in accordance with one aspect of the invention, calibration means are provided for adjusting the response of the loop control means to the driven member, whereby the ratio of the position of the driven member to that of the driving member is correspondingly adjusted. In accordance with a particular embodiment, the calibration means is adapted to be set in accordance with variations in the record medium. In accordance with another particular embodiment, a servo drive arrangement is provided to automatically control the calibration means in accordance with variations in the record medium.

In normal operation of the above described arrangements, the position of the driven member varies both in direct response to the driving motion of the driving member and in response to changes in the length of the extensible cable loop. The extensible cable loop, in turn, changes its length in response to the cooperation between the loop control means and the driving member. Hence, the motion of the driven member is a function of the drive motion of the driving member. However, since the response of the loop control means to the driving member can be adjusted, the gain of the response of the driven member to the output of the driving member may be adjusted, as for example, in accordance with variations in chart dimensions.

Various particular alternative arrangements in accordance with respective aspects of the invention are provided for varying the ratio or gain of the cable drive system by controlling the length of one or more extensible cable loops. In one such arrangement, the loop control means involves a floating double geared sector element coupled between the driving member and a pulley which is coupled in the extensible cable loop. In other such arrangements, curved geared sector elements are employed and control means are coupled thereto to vary the position of the center of curvature of the sector element with respect to the center of a fixed pulley, which in turn varies the distance between an idler pulley incorporated in the extensible loop and the fixed pulley and thereby controls the length of the extensible loop.

A better understanding of the invention will become apparent from the following description taken in conjunction with the drawings wherein like reference characters refer to like parts, and in which.

Figures 2, 3, 5:
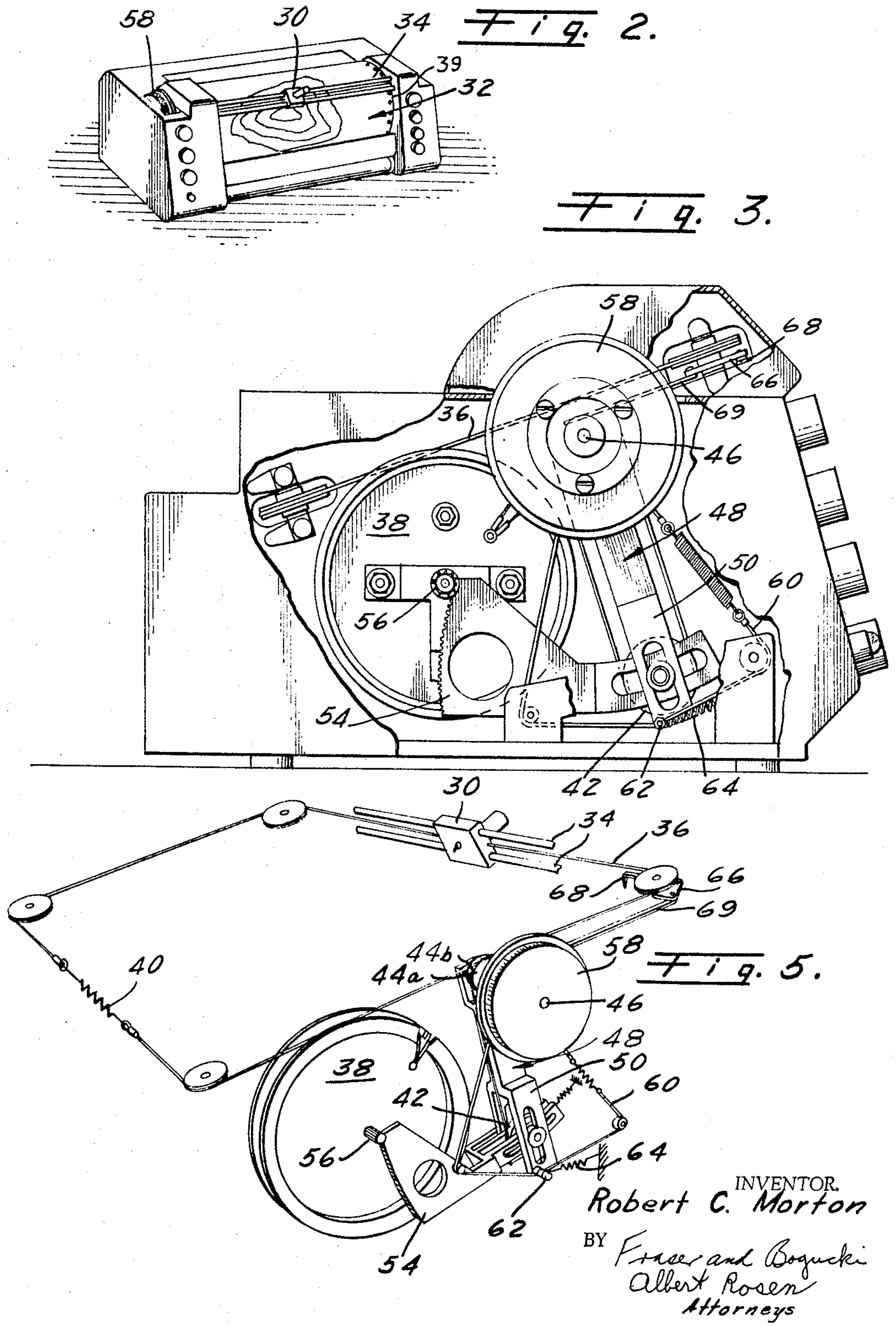
FIG. 2 is an isometric view of a type of recorder in which the invention may be usefully employed.
FIGS. 3, 4 and 5 are detailed illustrations of a preferred embodiment of the invention.
Figures 4, 7:
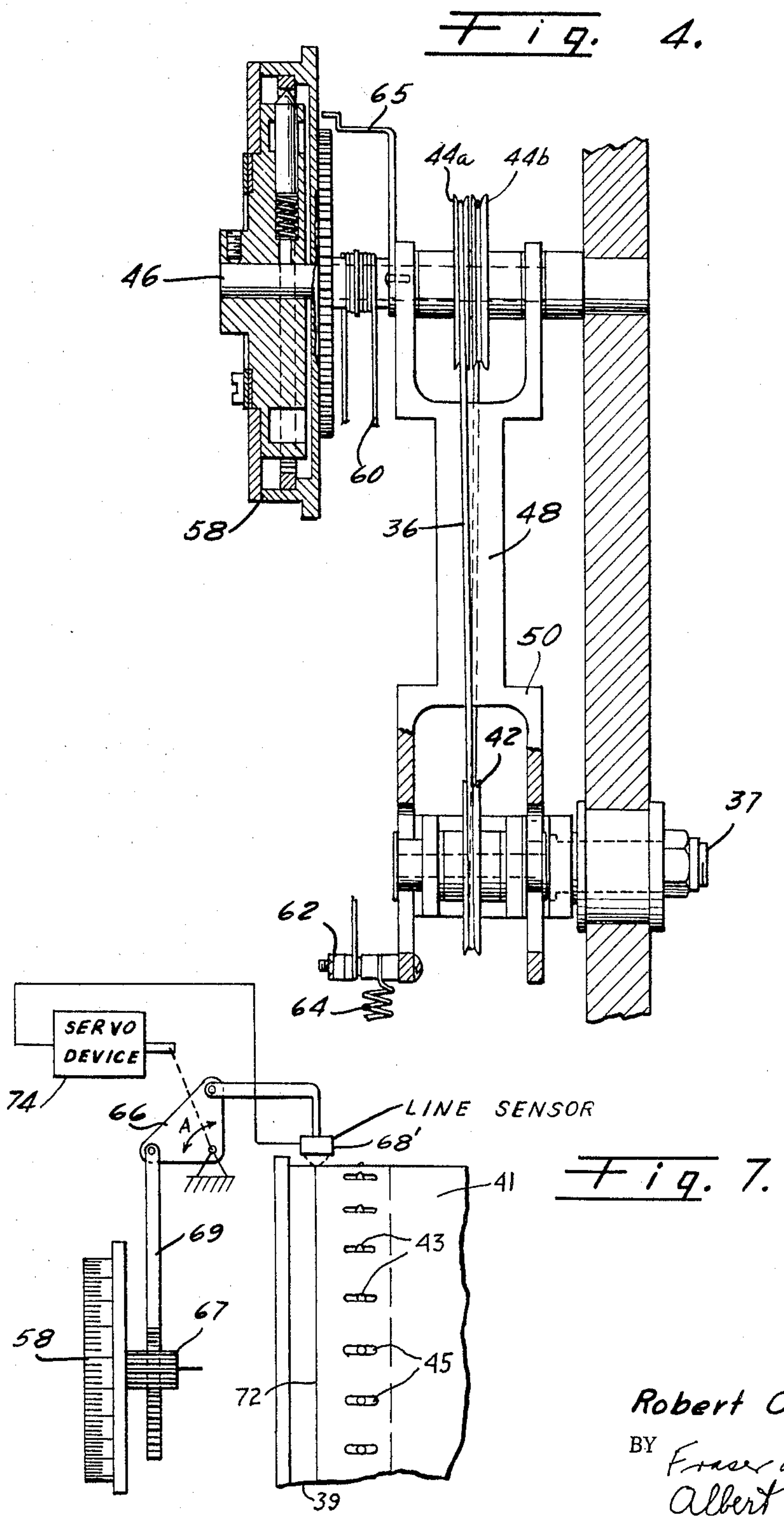
FIG. 7 is a diagram representing an alternative arrangement for the embodiment portion shown in FIG. 6.
Figures 9A, 9B:
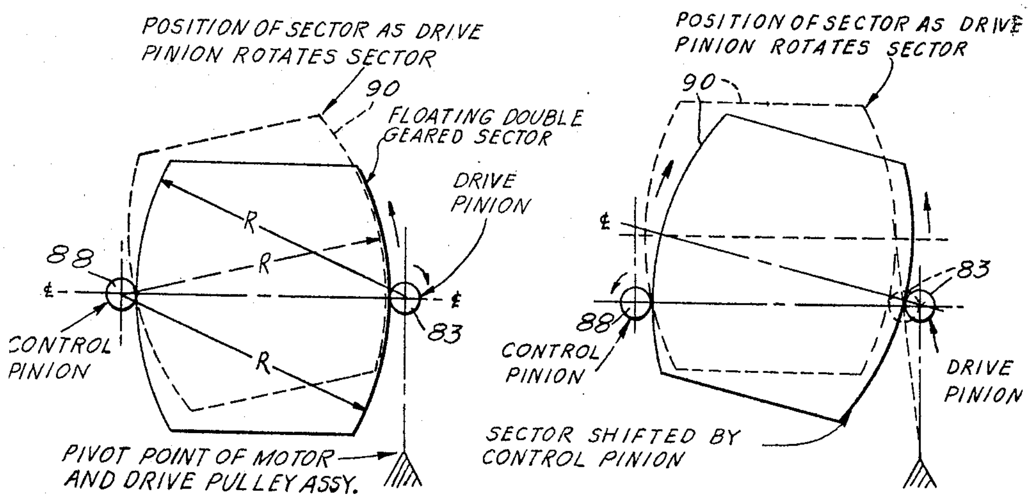
Figure 8:
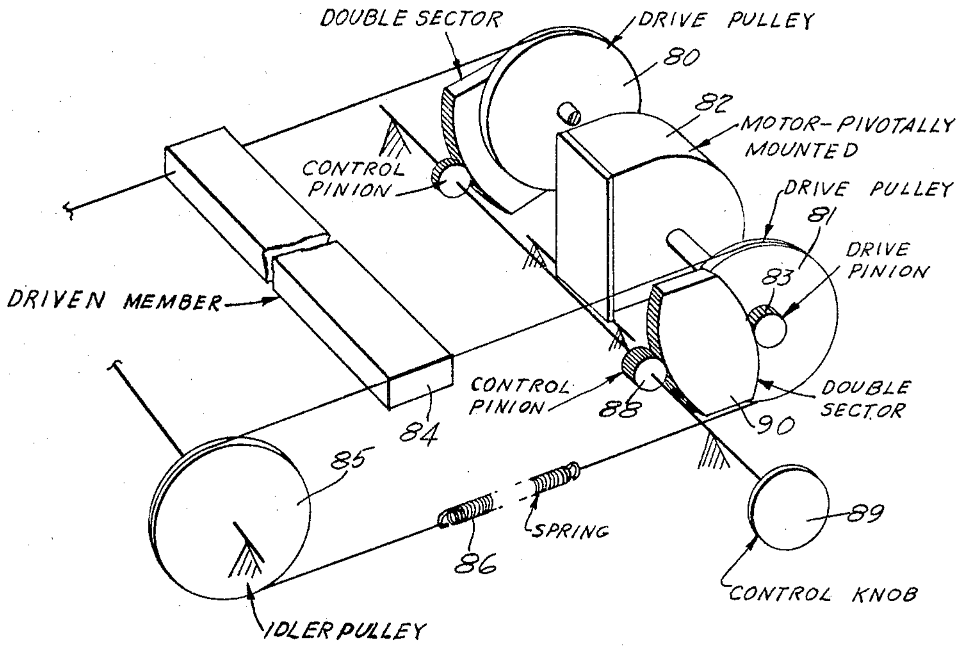
FIG. 8 is a representation of one alternative arrangement for a cable loop control mechanism which may be employed in the embodiment shown in FIGS. 3, 4 and 5.
Figure 10:
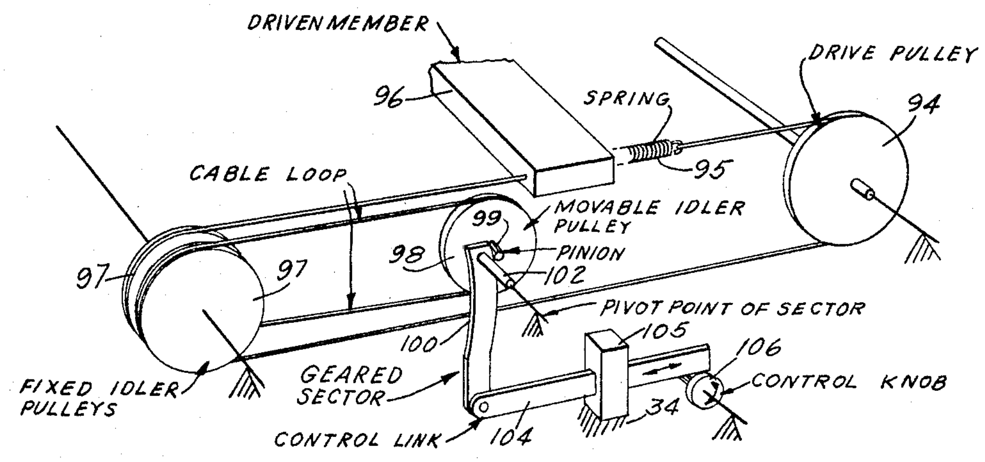
Figures 11A, 11B:
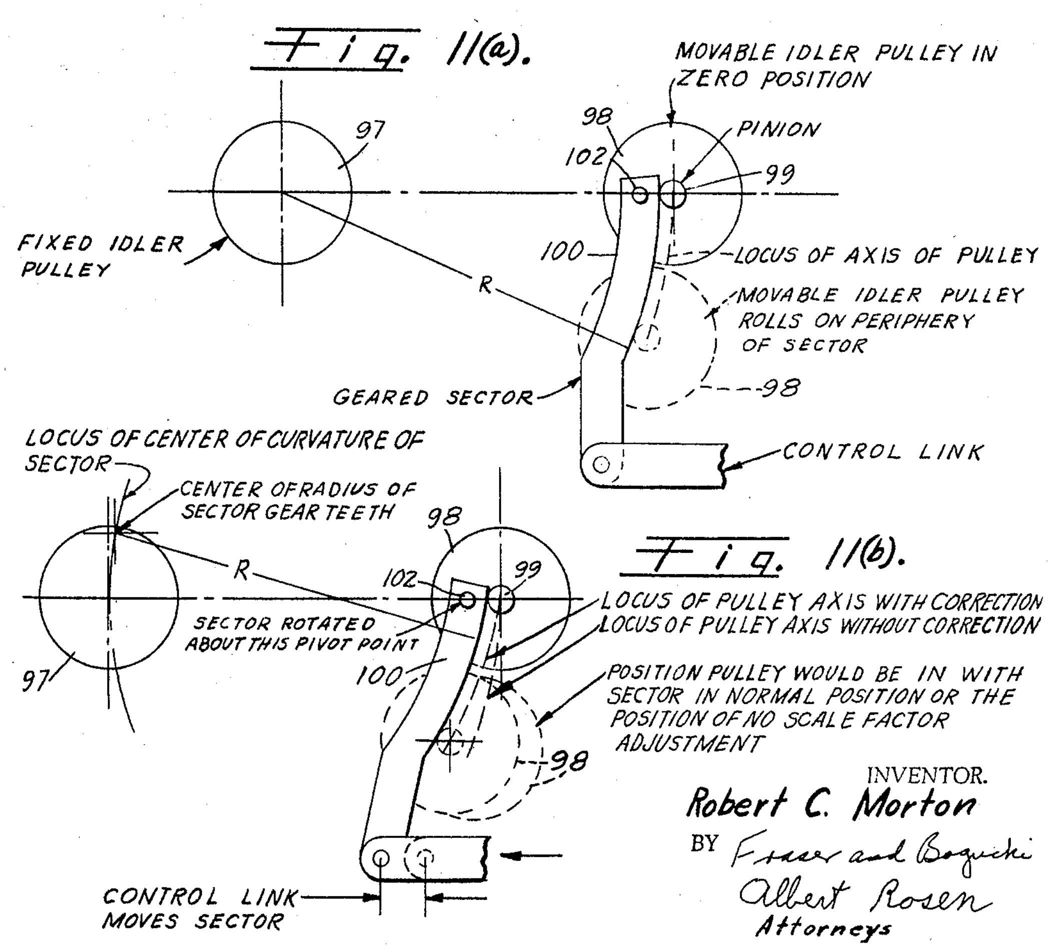
Figure 12:
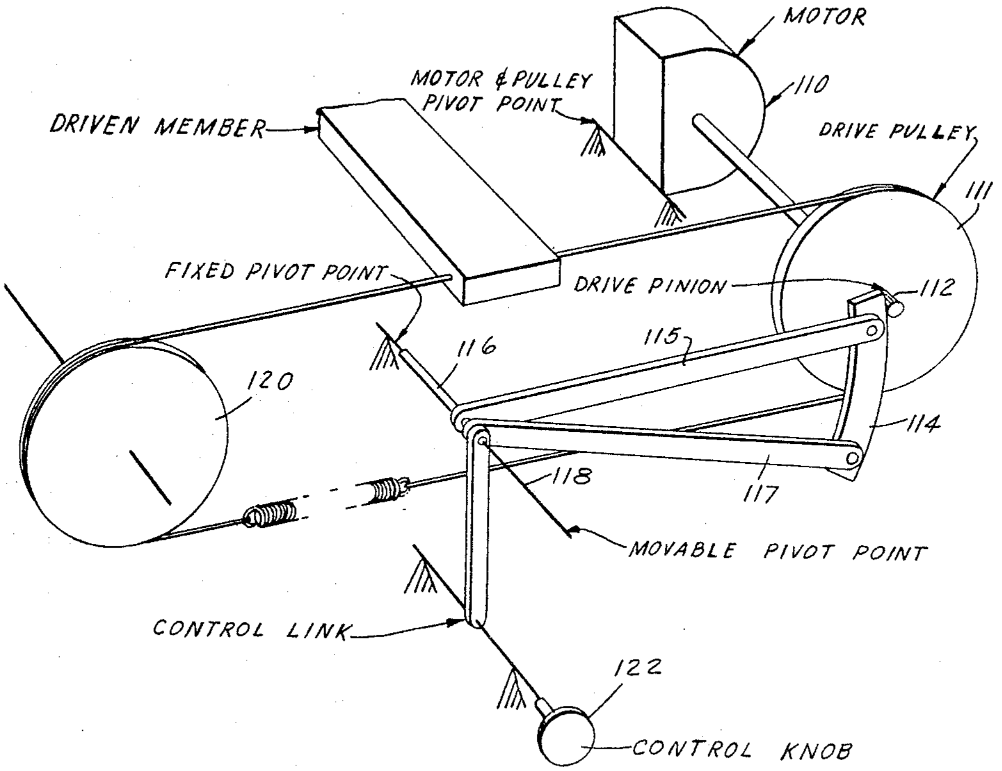
Figure 13:
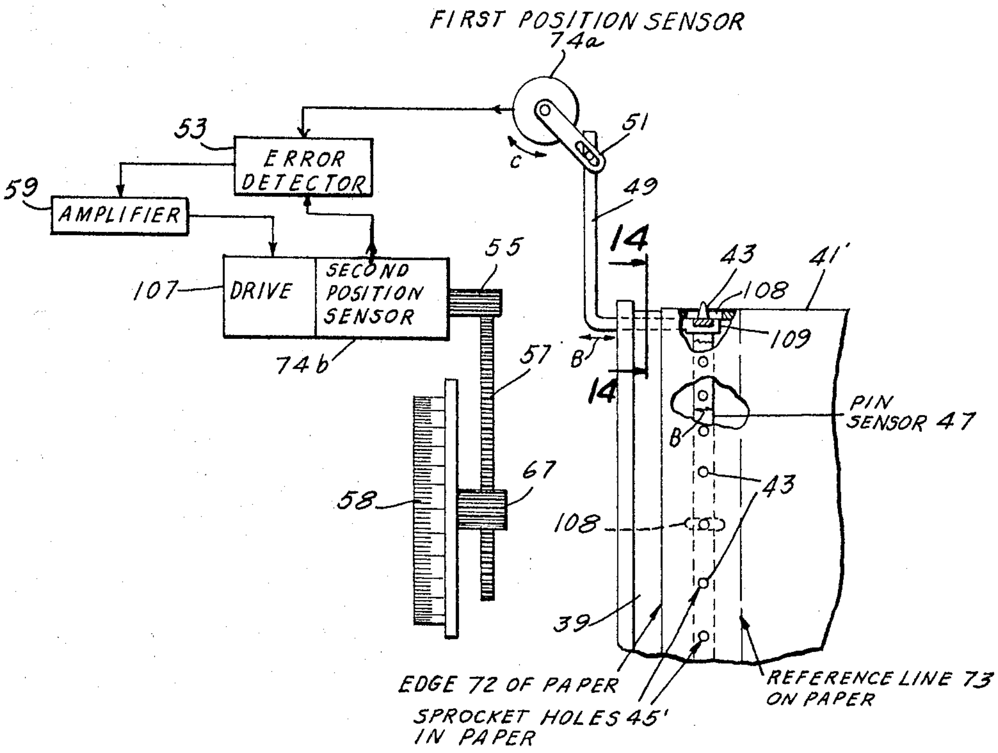
Figure 14:
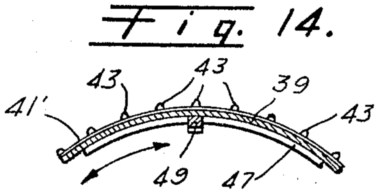

FIGS. 9(*a*) and 9(*b*) are views illustrating the principles of operation of the alternative arrangement of FIG. 8;

FIG. 10 is a representation of a second alternative arrangement for a cable loop control mechanism which may be employed in the embodiment of FIGS. 3, 4 and 5;

FIGS. 11(*a*) and 11(*b*) are views illustrating the principles of operation of the arrangement of FIG. 10;

FIG. 12 is a representation of a third alternative arrangement for a cable loop control mechanism which may be employed in the embodiment of FIGS. 3, 4 and 5;

FIG. 13 is a diagram representing an aspect of a servo arrangement according to another embodiment of the invention; and FIG. 14 is a sectional diagram of a portion of the arrangement depicted in FIG. 13, and taken thru lines 14—14 of FIG. 13.

Figure 1:
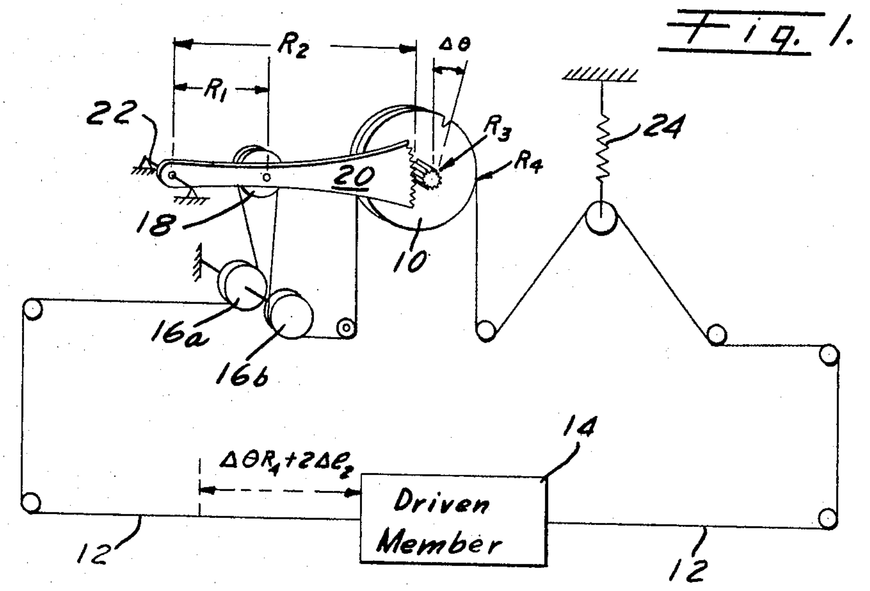
FIG. 1 is a schematic diagram of an extensible loop in cooperation with the drive member of a cable drive system, in accordance with one aspect of the invention.

Referring to FIG. 1, there is illustrated a schematic arrangement of an extensible loop, in cooperation with the drive member of a cable drive system. In this arrangement the cable drive system comprises a rotary drive member 10 in cooperation with a cable 12 for positioning a driven member 14. The cable 12 is secured to the driven member 14 and to the drive member 10.

The extensible cable loop of FIG. 1 comprises double pulley elements **16*a* and 16*b* along with control means responsive to drive member 10 for varying the cable loop distance between pulleys 16*a*, 16*b* and an intermediate idler pulley 18 of the extensible cable loop. The control means may comprise a horizontally-positioned quadrant member 20 mounted at one end thereof upon a pivot 22 for rotation in a vertical plane, the other end thereof engaging a pinion mounted on the horizontal drive shaft of the rotary drive member 10. The position of pivot 22 is fixed relative to that of pulleys 16*a*, 16*b***.

The intermediate pulley 18 is mounted at a radial distance $R_1$ intermediate the pivotal end and radial end of the quadrant member 20, whereby the rotation of the quadrant member 20 through an incremental vertical angle acts to change the vertically spaced relationship of pulley 18 to pulleys **16*a* and 16*b*. For example, the rotation of quadrant member 20 through an incremental angle counterclockwise tends to move the intermediate pulley 18 upwards an incremental vertical distance, as a function of the sine of such incremental angle. As the pulley 18 moves up and down in operation, a spring 24 allows the cable 12 to follow the movement of the pulley 18**.

In normal operation of the device of FIG. 1, an exemplary clockwise rotation of drive member 10 through an incremental angle ($\Delta\theta$) produces an incremental translational motion of driven member 14, which motion is comprised of two components. The first component or reference motion is equal to the peripheral distance through which the drive member 10 has traveled. Such distance ($\Delta l_1$) can be expressed as the product of the incremental angle ($\Delta\theta$) and the radius ($R_4$) of the drive member 10.

$$\Delta l_1 = \Delta\theta R_4 \qquad (1)$$

The second component motion is that produced by the change in the extensible loop in response to the clockwise rotation of drive member 10 through the incremental angle ($\Delta\theta$). Such motion is equal to twice the incremental vertical displacement of intermediate pulley 18 relative to the pulleys **16*a*, 16*b*. The incremental vertical motion of pulley 18($\Delta l_2$) may be expressed, in turn, as a function of the incremental angle ($\Delta\theta$), the gear ratio ($R_3/R_2$) of the combination of quadrant 20 and the pinion of drive member 10, and the radial distance ($R_1$) of the pulley 18 from pivot 22**:

$$\sin(-1\Delta l_2/R_1) = \Delta\theta \times (R_3/R_2) \qquad (2)$$

$$\Delta l_2 = [\Delta\theta(R_3/R_2)]R_1 \qquad (3)$$

where $[\Delta\theta(R_3/R_2)] < \pi/18$ radians (or 10°), since for small angles, the sine equals the angle. The motion ($\Delta l$) of driven member 14 is equal to the sum of the component motions $\Delta l_1$ and $2\Delta l_2$:

$$\Delta l = \Delta l_1 + 2\Delta l_2 \qquad (4)$$

Substituting Equation (3) into Equation (4):

$$\Delta l = \Delta l_1 + 2[\Delta\theta(R_3/R_2)]R_1 \qquad (5)$$

$$\Delta l = \Delta l_1 + 2[\Delta\theta(R_4/R_4(R_3/R_2]R_1 \qquad (6)$$

Substituting Equation (1) in the right-hand member of Equation (6):

$$\Delta l = \Delta l_1 + 2\Delta l_1[R_3R_4/R_1R_2] \qquad (7)$$

Combining terms:

$$\Delta l = \Delta l_1[1 + KR_1] \qquad (8)$$

and $$\Delta l/\Delta l_1 = [1 + KR_1] \qquad (8a)$$

where $K = (2R_3/R_4R_2)$.

Hence, it is to be appreciated that the extensible loop device in the cable drive system of FIG. 1 provides a scale factor of $[1+KR_1]$ in the response of driven member 14 to drive member 10. Such scale factor applies for drive motion of either sense (e.g., clockwise or counterclockwise rotation of rotary drive member 10).

From Equation (8), the scale factor correction term for the scale factor is seen to be proportioned to the radial distance ($R_1$) of the intermediate pulley 18 from quadrant pivot 22. Hence the scale factor may be adjusted by adjusting such radial dimension. Thus, the scale factor $[1+KR_1]$ may be made greater than, equal to, or less than unity by varying the relative positions of the pivot 22 and the pulley 18.

In FIGS. 2–5, an example of the present invention is given which shows its use in digital incremental plotters of the type widely used in computing systems. The plotter shown in FIG. 2, has a driven element in the form of a marking element 30 which is movable relative to a recording paper 32 under commands from an associated data processing system (not shown). In the most commonly used form, such as shown in FIG. 2, the recording paper 32 is advanced or reversed, to provide movements along one axis (the axis of rotation of the cylindrical drum 39); the marking element 30 which is supported on a carriage which extends transversely across the paper 32 and is moved in a direction orthogonal with respect to the direction of paper movement. For the desired incremental stepping action on the two axes, step motors which are coupled to receive separate actuating pulses are employed in each of the drive mechanisms.

In the direction of paper advance, it has been found convenient to employ a drum 39 bearing teeth or drive pins 43 which engage sprocket holes along each margin of the paper. The drum advance mechanism permits the motion of recording paper to be essentially continuous, thereby permitting data to be continuously recorded on a roll of recording paper. However, a flat bed type of recorder may also be utilized, in which the marking element is moved in each of two directions, or axes, while the paper itself is held stationary. With such arrangements, scale factor adjustments may be desired along both such axes.

In the mechanism shown in FIGS. 2–5, the marking element 30 is moved along a pair of transverse rods 34. A cable 36, affixed to a carriage bearing the marking element, extends parallel to the transverse rods from each side of the plotter. The cable 36 extends through a system of pulleys back to the drive mechanism, consisting primarily of a drive drum 38 which is directly driven by a stepping motor (not shown). The cable is wrapped a number of times around the drum and anchored thereon at a fixed post adjacent the drum periphery. A constant tension is maintained in the cabling system by a spring 40.

The adjustable scale factor mechanism is provided by the controlled variable length loop 36 having a portion wrapped in one or more turns around a cable drive drum 38. The cable 36 is introduced between the drive drum 38 and a pulley 42 which couples the cable to the plotting instrument. From the drive drum 38, the cable 36 passes over pulleys **44*a*, 44*b* of the double pulley arrangement which is mounted on a rotatable shaft having a fixed axis of rotation 46. This axis of rotation 46 also provides a central reference axis for the system. From the pulleys 44*a*, 44*b*, a variable length loop is formed in cable 36 by passing the cable along a control arm 48 which is also rotatably mounted upon the central reference axis 46 and which includes a terminating yoke 50 at its free end. Within the terminating yoke 50 a single pulley 42 is slidably and rotatably mounted within slots in the arms of the yoke 50 along the length of the control arm 48. Thus the cable 36 passes around one pulley 44*a*, down around the pulley 42 at the other end of the control arm 48, and back over the remaining pulley 44*b***.

The scale factor mechanism also includes a sector element in the form of an arm 54 having a circumferentially disposed set of teeth which engage a drive gear 56 which is disposed along the central axis of the drive drum 38. The sector arm 54 is rotatable about the axis of a mounting bolt 37 (FIG. 4) forming a second fixed reference axis for the system, this fixed reference axis being the center of the circle of which the geared surface of the sector arm forms a circumferential segment. When the movable pulley 42 is positioned on this second fixed reference axis, the loop formed in the drive cable does not change and no compensating action is introduced into the system.

The sector arm 54 does, however, also include extending arms which include curved slots which receive the shaft about which the movable pulley 42 rotates. These curved slots along the sector arm 54 form part of a circle about the central reference axis 46, when the sector arm is in a reference position. The shaft upon which the movable pulley 42 is mounted is constrained along one direction of movement by the slots in the yoke 50 along the control arm 48, and in another curved direction by the curved slots along the sector arm 54.

The control arm 48 can be moved to any radial position between the limits defined by the slots in the sector arm 54 by a rotatable graduated control knob 58 mounted on the shaft 46. The movement of control knob 58 operates a control cable 60 coupled to a pin 62 on the free end of the control arm 48. A spring 64 couples the pin 62 to a fixed point, thereby urging control arm 48 continually in a direction to the right, as illustrated in FIG. 5.

Where control arm 48 is radially oriented such that its free end intersects the center of curvature of the slots in sector arm 54, the turning of drum 38 results in zero translational displacement of pulley 42. Hence, no change results in the length of the extensible loop of cable 36, and the movement of driven member 30 is equal to the peripheral movement of drive member 38. In other words, the gain factor is unity and there is no scale factor adjustment.

If, however, the free end of control member 48 is oriented to the right of the unity gain position by an adjustment of the knob 58, then the rotation of drum 38 produces a change in the length of the extensible loop which corresponds to an increase or gain in the scale factor. On the other hand, if the knob 58 is adjusted to move the free end of control member 48 to the left of the unity gain position, then the length of the extensible loop portion of cable 36 is varied in accordance with an attenuation of the scale factor.

In one graph recorder or plotter embodying the afore-described scale factor adjustment mechanism, the cable was advanced by a stepping motor in digital increments of .01 inch. This resulted in a series of discrete .01 inch movements of the marking element (in this case a pen) along the width of the graphical recording paper. The width of the recording paper roll was 31 inches, and this provided a graph-ruled recording surface of 29½ inches in width. In one environment of high humidity the paper expanded 1 percent, expanding the spacing between adjacent graph lines on the paper by 1 percent. The .01 inch incremental step movements of the pen were thus received on the humidity-expanded paper as .0099 inch relative to the preprinted .01 inch rulings. (The preprinted .01 inch rulings were actually about .0101 inch apart in that environment.) Thus the 29.5 inch width recording surface would have a true measurement in that environmnent of about 29.8 inches, and data recorded at the extreme end of the paper width would be about .3 inch in error. (Similarly, in environments of extremely low humidity the typical recording paper contracts by approximately 1 percent over the nominal paper measurement, resulting in a .3 inch recording error in the opposite direction in such extremely dry environments.)

The scale factor adjustment arrangement increases or decreases the incremental movements of the cable (and thus also the digital incremental movements of the pen) by a uniform amount, regardless of the location of the cable and pen at any given time. Thus, if the scale factor adjustment has been selected to increase each .01 inch increment by an additional .0001 inch, each and every incremental step will be .0101 inch; this uniform and identical step size increase thus allows the plotter described to make 2950 discrete incremental steps to exactly cover the expanded 29½ inch width of the graph-ruled recording surface. (In this case 2950 .0101-inch steps would fill the entire approximately 29.8-inch width of the humidity-expanded paper; when the paper is later taken to a more normal humidity environment, and the recording surface contracts to its more normal 29½ inches, each incremental step will uniformly contract by .0001 inch, back to a more exact .01 inch.)

While the scale factor adjustment mechanism has been described as applied to a digital incremental plotter having a pen-like marking element, it is realized that other types of control elements may be substituted for the marking element described. For example, a photoelectric or other curve following device may be used.

Accordingly, it will be appreciated that the arrangement of the invention as described provides improved means for adjusting the scale factor of the mechanical cable drive system to provide either a gain factor or an attenuation factor, as desired, and with the gain factor adjustable to a selected magnitude. The described arrangement includes a particular mechanism, shown in major detail in FIG. 6, for permitting the adjustment of the scale factor by means of the control knob 58 to correspond to a particular reference line of the record medium or the edge of the medium itself. This includes a pivot plate 66 having a fixed pivot point, and mounted to pivot in directions A. This plate 66 is coupled between index means, in the form of a pointer 68, and a flat geared lever arm 69. The flat lever arm 69 is arranged to engage a similarly geared pinion 67 mounted on the control knob 58. The geared portion of the flat lever arm 69 is held in engagement with the pinion 67 of the control knob 58 by a retaining plate 65 (FIG. 4). As is customary in recorders of the type depicted, the record medium, typically in the form of a roll of chart paper, a portion of which (indicated at numeral 41) is fixedly aligned on the drum 39 supporting the recording medium by drive pins 43. The drive pins extends through round holes in the record medium along one edge thereof. Along the opposite edge of the recording medium, however, elongated slots 45 are provided in the record medium to engage the drive pins 43 in order to provide for the variations in the lateral dimension of the record medium which may be due to variations in temperature, humidity, and the like.

To select an appropriate scale factor providing the necessary compensation for any change in dimension in the record medium, the control knob 58 may be adjusted until the pointer 68 is positioned along the edge of the medium (in this case a portion strip of graph paper 41) represented by the solid line 72, or alternatively the pointer 68 may be aligned with a reference line on the paper, represented in this case by the broken line 73. The extensible loop of the cable drive system for the driven member 30 is thus adjusted to compensate for the variations encountered in the dimensions of the record medium. Hence, means are provided for adjusting a data plotting system for variations in the scale of the plotting paper or for scale factor tolerances in the plotting device itself. In the latter case, the graduated scale on the control knob 58 provides an indication of the extent of the compensation required.

Figure 6:
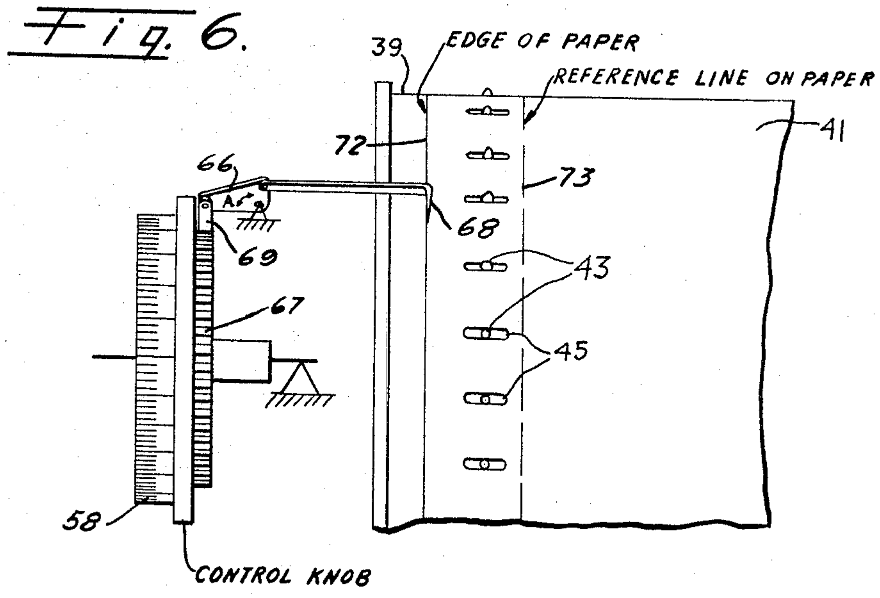
FIG. 6 is a diagram showing details of a particular portion of the embodiment of FIGS. 3, 4 and 5.

In accordance with an aspect of the invention which is represented in FIG. 7, the desired compensation for variations in the lateral dimension of the record medium of a data plotting device may be achieved automatically by coupling a servo device 74 to the output of index means in the form of a line sensor 68' which is mechanically linked to the pivot plate 66 and thereby to the control knob 58 in the manner of FIG. 6. The servo device 74 is geared to control the rotation of the pivot plate 66 (in directions A) about its pivot point in response to signals indicative of gain deviation from a desired gain or reference which are received from a line sensor 68'. Thus the servo device 74 is enabled to maintain the line sensor 68' aligned with a particular reference line (which may be the edge of the record medium) and accordingly adjusts the control knob 58 to control the position of the idler pulley 42 so as to adjust the scale factor or gain in accordance with the position of the line sensor 68'. Such an arrangement eliminates the need for constant calibration by an operator, and is particularly useful in conjunction with device which are maintained in continuous operation for extended time periods without attention.

In accordance with another aspect of the invention, depicted in FIGS. 13 and 14, the desired scale factor compensation is provided automatically in response to the position of the drive pins 43 that engage holes 45' along one edge of the graph paper recording medium 41'. The arrangement depicted in FIG. 13 is generally similar to that described with respect to FIG. 7, except that here the graph paper recording medium 41' has round holes 45' along the edge adjacent to the scale adjustment arrangement, instead of elongated slots as in the case of the recording medium used in the embodiments of FIGS. 6 and 7.

The drive pins 43 of FIG. 13 are all mounted for movement in lateral directions B relative to the recording medium support drum 39. This freedom for lateral movement allows the pins 43 to move with the recording medium as it expands and contracts in the lateral direction. In the example depicted, all of the pins 43' are fixed to a circular band-shaped pin sensor element 47 (FIG. 14) which is also mounted for lateral movement with respect to the support drum 39. The surface of the support drum 39 that supports the recording medium is provided with a number of transversely oriented slots (indicated by dashed lines by numeral 108), with each drive pin 43 projecting through its own drum slot. Thus, lateral movement of the recording medium results in a corresponding lateral movement of the drive pins 43 and also of the pin sensor element 47. The band-like pin sensor element 47 rotates with the rotation of the support drum 39. A first arm 49 is provided, having a yoke-like portion 109. The yoke-like portion embraces a small circumferential extent of the band-shaped sensor element 47, with the sensor element free to rotate through the yoke-like portion 109. While the sensor element 47 is free to rotate with the drum 39, transverse motions (in directions B) of the sensor element are communicated to the yoke-like portion 109 of the first arm 49. Thus the first arm 49 moves in lateral directions B in response to the lateral movement of the recording medium due to expansion or contraction.

The first arm 49 is linked to a second, slotted arm 51 so that movement of the first arm 49 in directions B causes the slotted arm 51 to move in arcuate directions C. The slotted arm 51 is connected to the armature of a first position sensing device **74*a* which translates the arcuate motion to corresponding electrical signals which are then fed to an error detector device 53. A second position sensing device 74*b*, connected by means of a pinion gear 55, through an intermediate gear 57, to the scale factor adjustment pinion gear 67, senses the position of this last-named pinion gear 67, and feeds electrical signals indicative of this position to the error detector device 53. This error detector device 53 compares the two incoming signals and generates a difference signal; the difference signal is fed, through an amplifier 59, to a drive device 107 that has a common shaft with the pinion gear 55 that controls the position of the scale factor adjustment gear 67. Thus, when the error detector device 53 senses a relative movement between the first and second position sensing devices 74*a* and 74*b*, the scale factor adjustment arrangement is automatically operated to compensate for the movement of the recording medium 41'. While the automatic scale factor adjustment described is illustrated as being completely automatic, it will be realized that a manual override can also be provided, allowing manual adjustment by means of the control knob 58** as well as by the automatic adjustment.

The automatic scale factor adjustment can also be provided as a result of control directly by externally generated information signals, as from a humidity and/or temperature sensor or even under computer control.

One particular arrangement which may be employed as an alternative mechanism to the yoked member 48 in the plotting device of FIGS. 3, 4 and 5 is represented schematically in FIG. 8. As shown, this arrangement includes a pair of drive pulleys 80 and 81 together with a drive pinion 83 mounted on the output shaft of a motor 82 which is pivotally mounted to rotate about a fixed pivot axis. The drive pulley 81 is coupled to a driven member 84 by means of suitable cabling, together with an idler pulley 85 and a spring 86 as shown. There are also provided a rigidly mounted but rotatable control pinion 88 and a control knob 89 coupled thereto. Between the control pinion 88 and the drive pinion 83, a floating double sector element 90 is positioned and is held in place by the tension of the cables.

The double sector element 90 is represented in greater detail in FIG. 9(*a*) which shows the sector element 90 in its neutral or unity scale factor position. The teeth on each side of the double sector element 90 are cut using the opposite pinion for a center of curvature. This permits either pinion, 83 or 88, to be rotated, providing that the other pinion is held stationary in coincidence with the center of curvature of the rotating sector, and the distance between the pinions, 83 and 88, remains constant. This can clearly be seen from the broken outline shown in FIG. 9(*a*) which represents the double geared sector element 90 rotated about the control pinion 88 without varying the distance between the two pinions 83 and 88. However, as shown in FIG. 9(*b*), if the control pinion 88 is rotated so that the center of curvature of the double sector element 90 no longer coincides with the axis of the control pinion 88, subsequent rotation of the drive pinion 83 causes the distance between the centers of the control pinion 88 and the drive pinion 83 to either increase or decrease, depending upon the direction of rotation of the drive pinion 83 and the setting of the control pinion 88. This change in distance may be appreciated by comparing the broken outline representation of the double geared sector element 90 with the solid outline of the element 90 as shown in FIG. 9(*b*), and the corresponding positions of the broken and solid outlines representing the drive pinion 83. Variation of the distance between the pinions 83 and 88 in this fashion causes the entire movable motor and drive pulley assembly to be moved a small distance with each incremental angle of rotation of the drive pinion 83. Although this has been described for only a single drive pulley portion of the arrangement of FIG. 8, a corresponding similar arrangement may be employed in conjunction with the second drive pulley 80 in a double cable system and, depending upon the initial settings of the control pinions, the manufacturing tolerances of the two drive pulleys, 80 and 81, may be compensated for, or nonlinearities in the record medium may be balanced out. Although the diagram of FIG. 8 shows the sector element 90 being arranged to move the motor and drive pulley assembly, it can be seen that the motor 82 and the drive pulleys 80 and 81 may be rigidly mounted if desired, in which case the idler pulley 85 would be moved instead.

A second alternative mechanism for varying the length of an extensible cable loop in a cable drive system as depicted in FIGS. 3, 4 and 5 is shown in the diagram of FIG. 10. In this arrangement a drive pulley 94 is shown coupled to control the position of a driven member 96 by means of suitable cabling running over a pair of fixed idler pulley 97 and a movable idler pulley 98. The arrangement also includes a spring 95 to take up any slack in the cable system. The movable idler pulley 98 has a pinion 99 mounted on its shaft and arranged to engage a geared sector element 100. The geared sector element 100 has a center of curvature which is arranged to coincide with the fixed axis of the fixed idler pulleys 97 when the mechanism is adjusted to provide the zero scale factor correction (i.e. unity scale factor for the system). The sector 100 is mounted on a pivot axis 102 which is in line between the fixed idler pulleys 97 and the movable idler pulley 98 when the latter is in its zero scale factor correction position, and is moved about this pivot axis 102 by a control link 104 which engages a control knob 106 and is held in position against the control knob 106 by a fixed slide member 105.

The principles of operation of the mechanism of FIG. 10 are represented schematically in FIGS. 11(*a*) and 11(*b*). From these figures, it can be seen that as the movable idler pulley 98 rolls on the periphery of the sector element 100 with the center of curvature of the gear teeth of the sector 100 coincident with the axis of the fixed idler pulley 97, the length of the cable loop connecting the fixed idler pulley 97 and the movable idler pulley 98 does not change in length. However, as particularly shown in FIG. 11(*b*), if the sector 100 is rotated about its pivot point 102 so as to move its center of curvature off the axis of the fixed idler pulley 97, the subsequent rotation of the movable idler pulley 98 about the periphery of the sector element 100 results in a change of the distance between the axis of the fixed idler pulley 97 and the movable idler pulley 98. This distance will be either increased or decreased, depending upon the direction of rotation of the movable idler pulley 98 and the direction in which the sector 100 is rotated. In this arrangement, it is preferred to fasten the cable to the movable idler pulley in order to prevent slippage which might otherwise introduce errors into the system.

FIG. 12 represents another modification in an arrangement for varying the length of the cable drive system which may be employed in the device shown in FIGS. 3, 4 and 5. In the arrangement of FIG. 12, a motor 110 and drive pulley 111 are shown pivoted about an axis parallel to the motor shaft. A pinion 112 mounted on the motor shaft engages gear teeth on the periphery of a floating sector element 114. One end of the sector element 114 is connected to an arm 115 which is free to rotate about a fixed pivot point 116. The other end of a sector element 114 is connected to an arm 117 which is rotatable about a movable pivot point 118. The radius of curvature of the sector element 114 is equal to the distance between the fixed pivot point 116 and the periphery of the sector element 114. Thus, when the movable pivot point 118 coincides with the fixed pivot point 116, the center of curvature of the sector element 114 also coincides with these two points. In such a position, the periphery of the sector element 114 maintains a constant radial distance from the fixed pivot point 116 so that as the drive pinion 112 rotates the sector element 114, the drive pinion 112 remains in its same position without varying the distance between the drive pinion 112 and an opposite idler pulley 120. However, if the movable pivot point 118 is varied in position, as by rotating a control knob 122, so that the lower end of the sector element 114 is moved either toward or away from the idler pulley 120, then as the drive pinion 112 rotates the sector element 114, the sector periphery is no longer at a constant distance from the fixed pivot point 116. As a result, the drive pinion 112 moves either toward or away from the idler pulley 120 and results in a scale factor variation in accordance with the setting of the control knob 122.

Although there have been described above various specific arrangements of scale factor adjustment mechanisms in accordance with the invention for the purpose of illustrating the manner in which the inventioin may be used to advantage, it will be appreciated that the invention is not limited thereto. Accordingly, any and all modifications, variations or a group of arrangements falling within the scope of the annexed claims should be considered to be a part of the arrangement.

What is claimed is:

1. In a cable drive system having a cable, extensible cable loop means for varying the gain of said drive system comprising an idler pulley having a fixed axis of rotation, a movable pulley having a pinion, an adjustable geared sector having a center of curvature, said pinion of said movable pulley engaging said geared sector, the cable of said cable drive system being looped about said idler pulley, means for adjusting the position of said center of curvature of said geared sector, and index means coupled to control said adjusting means.

2. The device of claim 1 in which said center of curvature is nominally coincident with the fixed axis of rotation of said first mentioned pulley, and in which said means for adjusting adjusts said center of curvature from and relative to said fixed axis.

3. The device of claim 1 further including indicating means cooperating with the position adjusting means for indicating the deviation of the gain of said device relative to a desired gain.

4. The device of claim 3 further including means cooperating with the index means for providing signals indicative of the gain deviation relative to a desired gain, and servo means responsive to said signals for adjusting the gain of said device in such sense as to reduce said signals.

5. In a cable drive system having a cable, an extensible cable loop mechanism for varying the gain of said drive system comprising: a pair of idler pulleys commonly mounted for rotation about a fixed common axis of rotation; a movable pulley having a pinion; an adjustable geared sector having a center of curvature; said pinion of said movable pulley engaging said geared sector; the cable of said cable drive system being successively looped about one pulley of said pair of pulleys, said movable pulley and the other pulley of said pair of pulleys; and means for adjusting the position of said center of curvature of said geared sector including an index element and control means coupled to the index element.

6. In a cable drive system having a cable, an extensible cable loop mechanism for varying the gain of said drive system comprising: a pair of idler pulleys commonly mounted for rotation about a fixed common axis of rotation; a movable pulley having a pinion; an adjustable geared sector having a center of curvature; said pinion of said movable pulley engaging said geared sector; the cable of said cable drive system being successively looped about one pulley of said pair of pulleys, said movable pulley and the other pulley of said pair of pulleys; and means for adjusting the position of said center of curvature of said geared sector comprising fixed pivot means for rotatably mounting said geared sector about a point other than its center of curvature, and control link means for rotatably orienting said sector upon said fixed pivot means whereby the locus of positions of said center of curvature passes through said axis of said pair of pulleys.

7. In a cable drive system having a driving member in cooperation with a driven member, means for adjusting the ratio of the mechanical motion of said driven member to that of said driving member comprising: an extensible cable loop comprising a double pulley and a single pulley at opposite ends of said loop, means responsive to said driving member for varying the cable loop distance between said pulleys as a function of the driving motion of said driving member, and automatic means for controlling said cable loop varying means.

8. The device of claim 7 further comprising manual means for adjusting said function of the driving motion by which said cable loop distance is varied.

9. In a cable drive system having a driving member and a driven member, means for adjusting the mechanical displacement gain of said cable drive system, comprising in combination: an extensible cable loop having a double pulley at one end and a single pulley at the other, adjustable means for varying the relative distance between said pulleys, said adjustable means being responsive to the driving member of said cable system whereby the speed of the driven member relative to the speed of the driving member is a function of the cooperation of said adjustable means and said driving member, index means coupled to said adjustable means for selecting a predetermined function of cooperation, a pinion on said single pulley, a geared sector rotatably mounted for rotation about a point other than its center of curvature, said pinion engaging said geared sector, and means for adjusting the extent of rotation of said sector about said point.

10. In a cable drive system having a driving member and a driven member, means for adjusting the mechanical displacement gain of said cable drive system, comprising in combination: an extensible cable loop having two spaced apart pulleys, adjustable means for varying the relative distance between said pulleys, said adjustable means being responsive to the driving member of said cable system whereby the speed of the driven member relative to the speed of the driving member is a function of the cooperation of said adjustable means and said driving member, said adjustable means including a double geared sector element engaging a drive pinion and a control pinion, said sector element having a center of curvature arranged to coincide with the control pinion in a reference position, and means for displacing the center of curvature of said sector element from the control pinion whereby the displacement of said driven member relative to the motion of said driving member may be adjusted.

11. In a cable drive system having a rotational driving member and a translationally driven member, an extensible cable loop for adjusting the mechanical gain of the system comprising: first and second mutually spaced pulleys in cooperation with said cable drive system; an intermediate pulley in cooperation with said cable system and spaced in said cable loop intermediate said first and second pulleys; a curved sector element pivotable to engage said intermediate pulley; and means including a pinion engaging said curved sector element, responsive to the rotational position of said driving member for varying the position of said intermediate pulley along said curved sector element; whereby the rate of change of length of said extensible loop is substantially proportional to the rate of rotational speed of said driving member.

12. The device of claim 11 in which there is further provided calibrating means for adjusting the response of said first mentioned means to said driving member whereby the ratio of the speed of said driven member to that of said driving member is correspondingly adjusted.

13. The device of claim 11, further including index means coupled to said last-named means for selecting a predetermined function of mutual cooperation.

14. In a digital incremental graph recorder, a mechanism for adjusting the increments of movement of a recording instrument to provide for desired variations from nominal increments, comprising: a driving member, a driven member, means including a drive cable coupling the driving member to the driven member and providing an extensible cable portion, and scale changing input means for automatically controlling said extensible portion in response to externally generated information received by said graph recorder.

15. In a digital incremental graph recorder, a mechanism for adjusting the increments of movement of a recording instrument to compensate for variations from nominal increments, comprising: a driving member, a driven member, means including a drive cable coupling the driving member to the driven member and providing an extensible cable portion, and means for automatically controlling said extensible portion in response to scale variations encountered in said graph recorder.

16. The mechanism of claim 15 further including a first pulley having a first fixed axis of rotation, a movable pulley having a second axis of rotation spaced apart from the first axis, the drive cable being looped about the first and movable pulleys, and means having a nominal position for supporting the second pulley and coupled to the driving member for changing the position of the second axis of rotation incrementally for each movement of the driving member.

17. The mechanism of claim 16 in which said means for changing position further comprises means for changing the distance between said first and second axes of rotation for each movement of the driving member.

18. The mechanism of claim 16 further including a motor coupled to drive the driving member, means pivoting said motor about a base axis, and a curved sector element rotatable to control the position of the second pulley in order to vary the length of the extensible cable portion.

19. In a digital incremental graph plotter, a mechanism for adjusting the increments of movement of a recording member to compensate for variations from normal-increments of a recording medium on which the recording member is to plot, comprising: a recording-medium support-member having a surface adapted to support a recording medium thereon; pin sensor means mounted for movements relative to said support surface in given substantially linear directions parallel to at least a portion of said support surface, said pin sensor means having pin projections extending in directions substantially normal to said surface, whereby said pin projections are adapted to protrude through and engage a recording medium supported on said recording-medium support-member where said recording medium has apertures with cross-sectional dimensions substantially corresponding to the cross-sectional dimensions of said pin projections adjacent to said recording-medium support-surface; an arm mounted to be controlled in movements in said linear directions, said arm engaging said pin sensor means where movements of said pin sensor means are translated to corresponding movements of said arm; scale adjustment means connected to the recording member for adjusting the size of the increments of movement of the recording member relative to the recording-medium support-member surface; and position sensor means connected between said scale adjustment means and said arm to receive motion of said arm in said linear directions and operate said scale adjustment means to a degree that is a function of the extent of movement of said arm; whereby automatic control is provided adjusting the increments of movement of a recording member as a function of variations in the dimension of the recording medium in said linear directions.

20. The mechanism of claim 19, wherein said recording medium support member is a rotatable drum having a generally cylindrical medium support surface, and wherein said pin sensor means is mounted for rotation with said drum.

References Cited by the Examiner

UNITED STATES PATENTS 2,432,229 12/1947 Dern ---------------- 346—70

RICHARD B. WILKINSON, *Primary Examiner.*